UNITED STATES PATENT OFFICE.

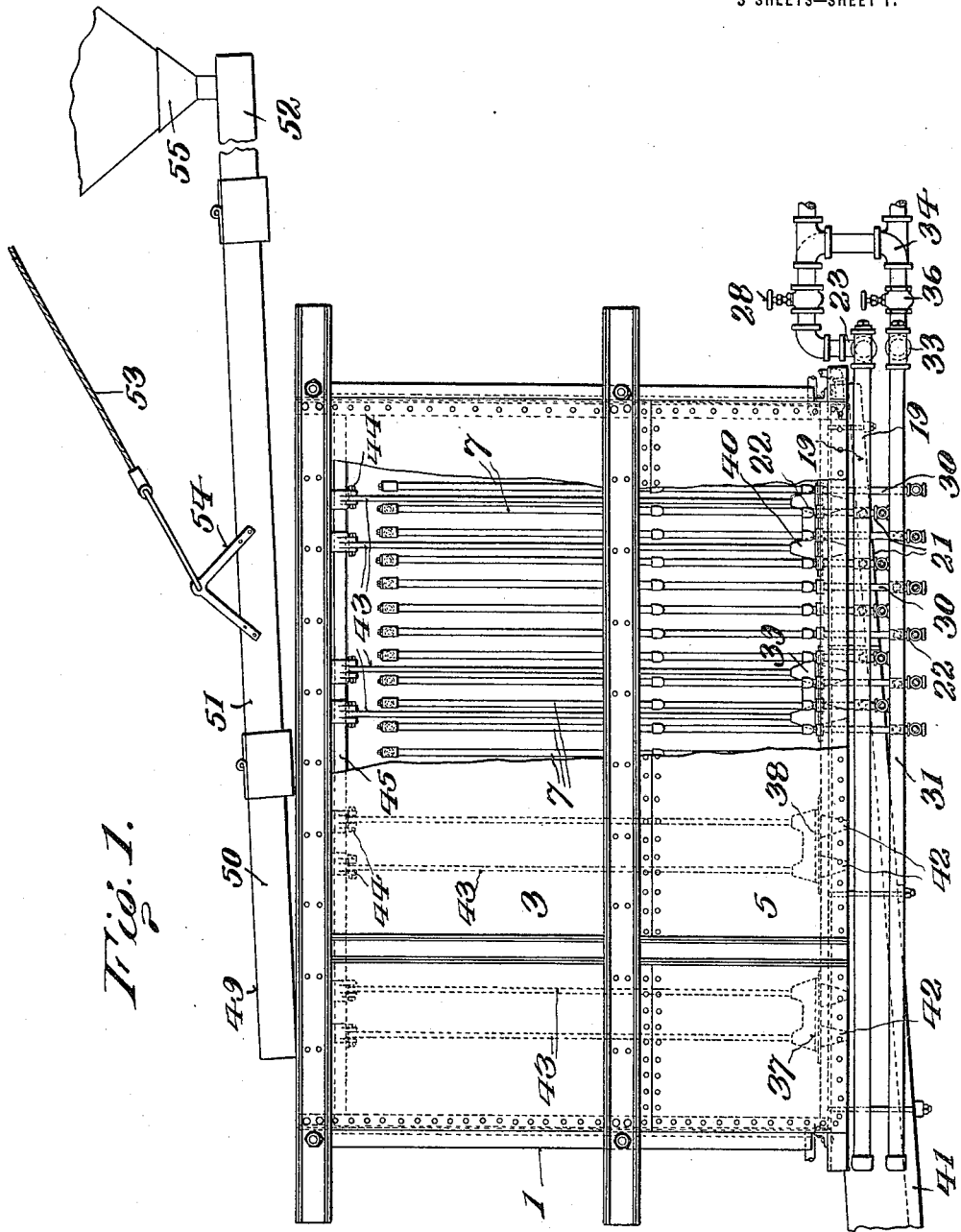

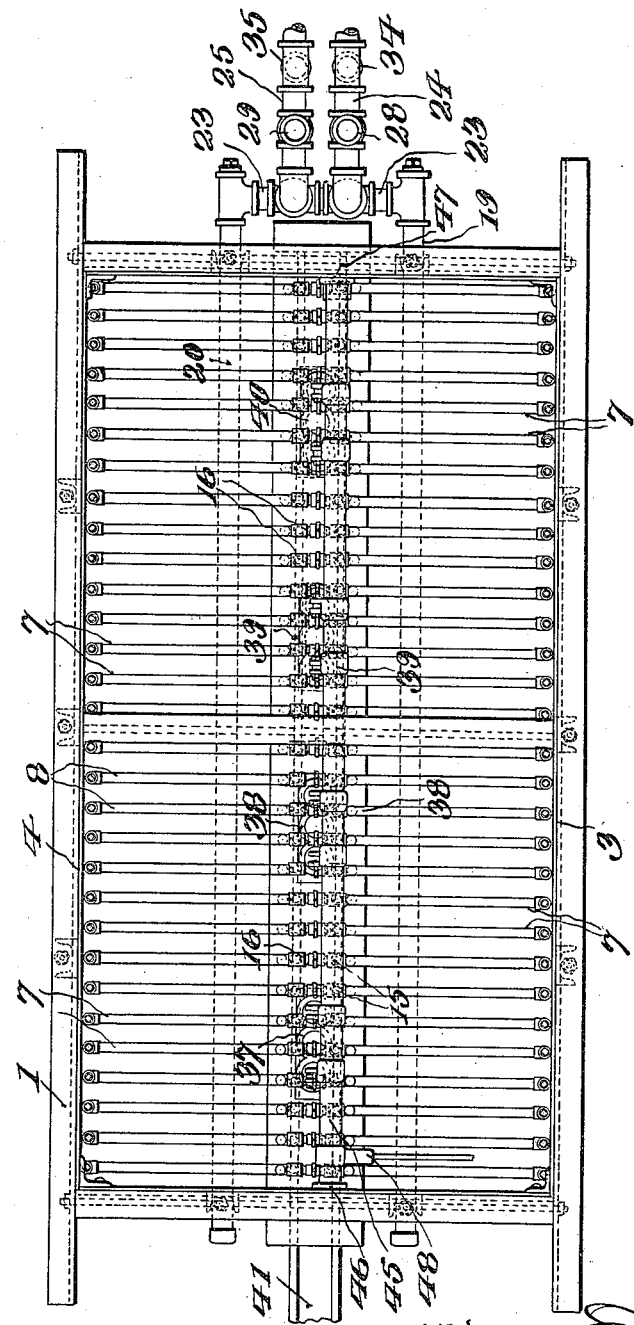

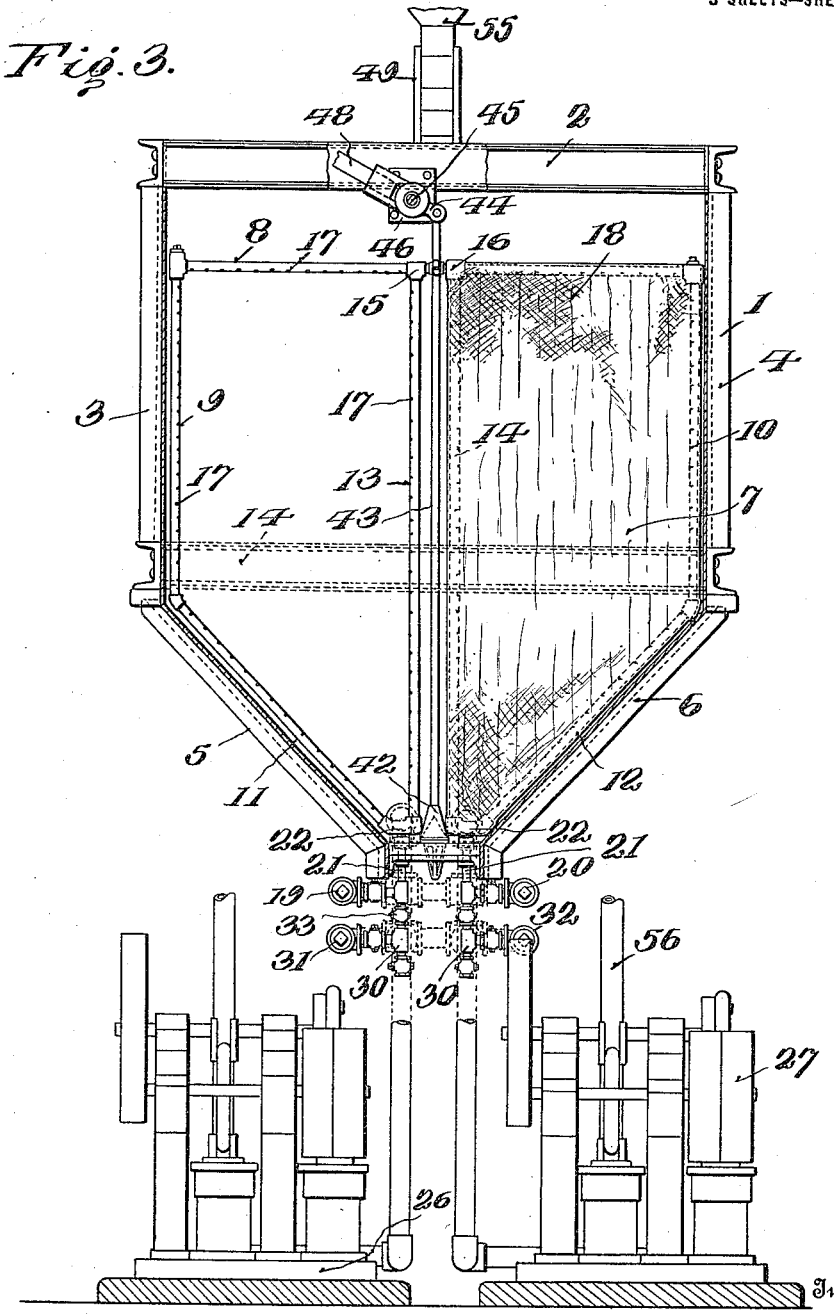

WILLIAM E. HOLDERMAN, OF SALT LAKE CITY, UTAH.

FILTERING APPARATUS.

1,150,369.  Specification of Letters Patent.  Patented Aug. 17, 1915.

Application filed June 26, 1913. Serial No. 775,985.

*To all whom it may concern:*

Be it known that I, WILLIAM E. HOLDERMAN, a citizen of the United States, residing at Salt Lake City, in the county of Salt Lake and State of Utah, have invented new and useful Improvements in Filtering Apparatus, of which the following is a specification.

This invention relates to certain new and useful improvements in a filtering apparatus, and more particularly to an apparatus of that class employed in the treatment of ores by the cyanid process for use for extracting the metal therefrom.

The object of this invention is to facilitate the washing of ore slime and to thoroughly and efficiently separate the metal in solution from the slime.

A further object is to provide means whereby wash water may be introduced into the filter while the process of drawing off the metal in solution is being carried on, thus permitting a continual operation of the filter without interruption caused by the introduction of the wash water.

Another object is to provide a plurality of filter leaves coöperating with a series of inlets and outlets whereby wash water may be introduced into the alternate leaves at the same time that the process of drawing off the metal in solution is being carried on in the other leaves, thus permitting the washing and discharging operation to be carried on simultaneously. Thus it is to be noted that the introduction of the wash water will assist in the effective separation of the slime and the metal in solution, and by this means there will be obtained a higher degree of purity in the filtrate as well as a more efficient operation of the filter.

A still further object is to provide means for flushing the filter leaves from the deposits of slime formed thereon during the filtering process, and to effect this flushing without interruption of the operation of the filter.

Another object is to provide means for introducing wash water into every part of the filter leaf with a view to thoroughly flushing the same.

Still another object is to provide means for drawing off the slime during the operation of the filter.

Finally, an object of this invention is the provision of means for quickly reversing the process of introducing the wash water into the alternate leaves and causing the washing process to be carried on in the other leaves and enabling the process of drawing off the filtrate to be substituted in the leaves first named. Thus there will be obtained a maximum efficiency in the operation of the filter as well as a thorough cleansing and washing of every part thereof, without any interruption whatsoever of the operation of the filter, thus enabling a continuous use of the same, a result which will effect the saving of much time and a consequent reduction in expenditure.

With these and other objects in view, the invention consists in the construction, arrangement, and combination of parts hereinafter more fully described in a preferred form, reference now being made to the accompanying drawings, in which:

Figure 1 is a side elevation partly in section to show the arrangement of the filter leaves; Fig. 2 is a plan to show the means for introducing wash water into the leaves and also the means for drawing off the filtrate; Fig. 3 is an end view partly in section showing the means for drawing off the slime from the bottom of the tank and also to show connections of the leaves with the means for introducing the wash water and the means for drawing off the filtrate.

As shown in the drawing, 1 indicates the tank which may be of any suitable construction, but preferably pentagonal in shape, having the top wall 2 and the side walls 3 and 4 at right angles to each other, and the two bottom walls 5 and 6 sloping toward each other to form a trough like cavity in the lower portion of the tank.

Disposed within the tank 1 and spaced at regular intervals therein are the filter leaves 7, formed of a frame work of jointed piping covered with a suitable filtering fabric. This frame work consists of a horizontal pipe 8 parallel to the top 2 of the tank and extending to its opposite ends thereof. Secured to the ends of the horizontal pipe 8 by suitable coupling means, are the vertical pipes 9 and 10 which are in turn coupled at their other ends to the inwardly sloping pipes 11 and 12, the opposite ends of which are secured to a pair of vertical pipes 13 and 14 extending upwardly on each side of the vertical center line of the frame work and jointed respectively at 15 and 16 to the horizontal pipe 8. It will thus be seen that a continuous circulation of liquid is effected throughout the entire surface of the frame. A series of perforations 17 in the pipes permit the introduction of wash water into the interior of the filter leaf in a fine spray like condition. To constitute the filtering means the opposite halves of the frame work extending from the pipes 10 to 14 and the pipes 9 to 13 are enveloped in suitable filtering fabric 18 which may be secured thereto by any suitable means, in the present instance by stitching.

Extending beneath the tank on opposite sides thereof, is a pair of pipes 19 and 20 having a series of upstanding couplings 21 projecting into the tank and connecting at 22 with the frame work of each alternate filter leaf. At one end the pipes 19 and 20 are connected by means of the pipe 23 which is provided with a pair of pipes 24 and 25 leading respectively to the force pump 26 and the suction pump 27. Cut offs 28 and 29 disposed within the pipes 25 and 24 regulate the direction of flow of liquid in the system comprising the pipes 19 and 20 and the frame work of the filter leaves coupled alternately thereto. It will thus be observed that by the use of the cut offs 28 and 29, water may be forced into the system by means of the force pump 26, or the operation may be reversed by shutting off the pump 26 opening the connection with the suction pump 27 and causing the same to actuate upon the system, thus drawing out the liquid from the tank through the series of filter leaves connected thereto. In like manner the other filter leaves interposed between those first named are provided with a series of connections 30 with the pipes 31 and 32 extending beneath the filter tank and directly below the pipes 19 and 20. These two pipes 31 and 32 are similarly connected at their ends by means of a pipe 33 which is provided with a pair of pipes 34 and 35 leading to the connections 24 and 25 of the coupling pipe 23 with the pumps 26 and 27. Cut offs 36 permit the reversal of the flow of fluid in the system comprising the pipes 31 and 32 and the series of filter leaf frame work connected thereto in the same manner as that provided for in the system comprising pipes 19 and 20 and the corresponding filter leaves.

In the bottom of the tank 1 are a series of pairs of openings 37, 38, 39 and 40 which form outlets into a trough 41 located beneath the tank and between the pairs of pipe connections 19, 20, 31 and 32, leading to the pumps 26 and 27. Coöperating with these openings are a series of valve pistons 42 disposed on the ends of suitable stems 43 which are connected at their upper ends for reciprocatory movement with the links 44 mounted on a common shaft 45 journaled in bearings 46 and 47 in the frame of the tank 1. A lever 48 mounted on the said shaft will cause the same to rock, thus reciprocating the valve stems 43 to open and close the valves 37, 38, 39 and 40 when desired. Means is thus provided whereby slime accumulating in the bottom of the tank may be drained off at the will of the operator from every point within the tank into the trough 41. Located above the tank 1 is a supply trough 49 formed of hinged sections 50, 51 and 52 which may be raised or lowered by means of the cable 53 connected at 54 to the section 51 and at its other end to a pulley or any other suitable means (not shown) to regulate the supply of solution introduced into the tank from the supply hopper 55 which may be of any suitable construction.

In carrying out the filtering operation by means of the present improved filter, the cyanid solution, which is the means commonly employed in extracting gold from its ore, is introduced into the tank 1 from the feed hopper 55 through the trough 49. The ore is placed in the tank by any well known means. By opening the valve 28, disposed in the pipe 24, leading to the force pump 26, wash water is caused to flow into the pipes 19 and 20 and thence into the series of filter leaves coupled alternately thereto. On the other hand the valve connecting the system comprising the pipes 31 and 32 with the suction pump 27 is open and communication of this system with the force pump 26 is cut off, thus enabling the suction of the pump 27 to be exerted on the system comprising the said pipes 31 and 32 and the filter leaves coupled thereto and spaced alternately with respect to the filter leaves first named. During the operation of the tank the metal in solution is drawn through the filter leaves connected to the pipes 31 and 32 because of the suction exerted by the pump 27 on the system and thence into the pipe 56 which leads to a suitable tank, not shown. This will cause the residue to be deposited on the exterior surface of the filtering media covering the leaves acted upon by the pump 27. The opposite effect, however, will take place on the filtering media covering the leaves coupled to the system comprising the pipes 19 and 20 and the connections to the force pump 26. In this instance water will be introduced into the interior of the leaves in a fine spray like condition through the openings 11 formed in the pipes 3, 4, 5, and 6, thus causing the water to be forced through the pores of the filtering media to the exterior surface thereof and washing away any accumulation of slime which may have been formed on the leaf into the trough like cavity in the bottom of the tank 1. The force of the out-coming water will also have the effect of displacing any metal in solution which may be located in the area surrounding the leaf and causing the same to be propelled toward the leaf acted upon by the suction pump, thus assisting in the filtering operation which is being carried on at this point. Hence two beneficial results will be obtained, that is, first, thorough and effective flushing of one series of filter leaves and second a material assistance in the filtering operation of the other set of filter leaves, as well as a complete separation of all of the entire valuable product from the residue.

When the slime has accumulated to such a degree on the exterior surface of the leaves, coupled to the system acted upon by the suction pump 27 the operation is reversed, causing the pump 26 to introduce wash water into the pipes 31 and 32 and thence into the leaves coöperating therewith, and the pump 27 to exert its suction on the pipes 19 and 20 and the previously cleansed filter leaves coupled thereto. The series of valves 42 are then opened by rocking the shaft 46 and raising the stems 43, thereby allowing the slime to pass out of the tank through the openings 37, 38, 39 and 40 into the waste trough 41 from whence such suitable disposition thereof may be made as desired. By raising and lowering the trough 49 the supply of cyanid into the tank may be regulated to the degree desired.

In the improved construction shown, applicant has thus provided means, whereby wash water may be introduced into the filter while the process of drawing off the metal in solution is being carried on, and operation permitting a continuous and entirely uninterrupted working of the filter. The plurality of filter leaves disposed alternately on the several pipe connections permit wash water to be introduced into the alternate leaves, thus effecting a simultaneous discharging and washing operation, as well as a much more effective separation of the slime from the metal in solution than has been heretofore obtained and a consequent higher degree of purity in the filtrate.

The result of conveniently and quickly drawing off the slime from the filter tank is also accomplished by the means shown and described in this specification. Applicant has further accomplished a quick reversal of the process of introducing the wash water into the alternate leaves and causing the washing process to be carried on in the other leaves and enabling the process of drawing off the filtrate to be substituted in the leaves first named. Consequently, there will be obtained a maximum efficiency in the operation of the filter as well as a thorough cleansing and washing of every part thereof, without the slightest interruption of the operation of the filter, a result enabling a continuous use of the same, thereby effecting a saving of the time usually caused by cleansing the tank and accomplishing a considerable reduction in the expenditure necessitated in the carrying on of the process. Suitable valves, not shown, are provided on each filter leaf, to enable any one of them to be isolated from the stem, if desired.

While the present invention is capable of use in connection with the extraction of metal from its ores by the cyanid process, it is to be understood that this apparatus is not to be limited to the operation described herein.

Although the particulars of the present invention have been fully set forth, yet it is to be distinctly understood that the invention is not limited to the process structure described, but on the contrary any modifications are included which may be made without departing from the spirit and scope thereof.

What is claimed is:

1. In a device of the class described, the combination with a tank, of a series of filter leaves within said tank, means for introducing fluid into an alternate series of said leaves, and means for simultaneously drawing off fluid from the other series of said leaves.

2. In a device of the class described, the combination with a tank, of a series of filter leaves within said tank, means for drawing off filtrate through an alternate series of said leaves, and means for flushing the other series simultaneously with the drawing off of said filtrate.

3. In a device of the class described, the combination with a tank, of a series of filter leaves within said tank, means for drawing off filtrate from an alternate series of said leaves, means for flushing the other series of said leaves, and means for draining said tank.

4. In a device of the class described, the combination with a tank, of a series of filter leaves within said tank, means for drawing off filtrate from an alternate series of said leaves, means for introducing fluid into the other series of said leaves, means for reversing the travel of said fluid, and means for draining said tank.

5. In a device of the class described, the combination with a tank, of a series of filter leaves within said tank, means for drawing off filtrate from an alternate series of said leaves, means for introducing fluid into the other series of said leaves, means for reversing the travel of said fluid, and valve actuated means for draining said tank.

6. In a device of the class described, the combination with a tank, of a series of filter leaves within the tank, and a pair of pumps for simultaneously introducing and drawing off fluid from alternate series of leaves.

7. In a device of the class described, the combination with a tank, of a series of filter leaves mounted in the tank, a pair of pumps for simultaneously introducing and drawing off fluid from an alternate series of leaves, and means for reversing the travel of the fluid.

In testimony whereof I have hereunto set my hand in presence of two subscribing witnesses.

WILLIAM E. HOLDERMAN.

Witnesses:
A. M. CLARKE,
DEAN F. BRAYTON.

Copies of this patent may be obtained for five cents each, by addressing the "Commissioner of Patents, Washington, D. C."